UNITED STATES PATENT OFFICE.

ALBRECHT SCHMIDT AND ADOLF STEINDORFF, OF HÖCHST-ON-THE-MAIN, GERMANY ASSIGNORS TO FARBWERKE VORM. MEISTER LUCIUS & BRÜNING, OF HÖCHST-ON-THE-MAIN, GERMANY, A CORPORATION OF GERMANY.

MODE OF MANUFACTURING A NEW FORM OF SYNTHETIC INDIGO.

1,057,886.     Specification of Letters Patent.     Patented Apr. 1, 1913.

No Drawing.     Application filed August 23, 1911. Serial No. 645,610.

*To all whom it may concern:*

Be it known that we, ALBRECHT SCHMIDT, Ph. D., chemist, and ADOLF STEINDORFF, Ph. D., chemist, citizens of the Empire of Germany, residing at Höchst-on-the-Main, Germany, have invented certain new and useful Improvements in the Mode of Manufacturing a New Form of Synthetic Indigo, of which the following is a specification.

In U. S. Patent applications Ser. No. 576,703, filed 11th August 1910, and Ser. No. 577,200, filed 15th August 1910, it has been described that indigo can be produced in an extremely finely subdivided condition by causing it to form in presence of an aromatic sulfonic or carboxylic acid, for instance from its leuco compounds by the action of the atmospheric air or any other oxidizing agent, or from its mineral-acid salts or solutions by dissociation with water. Now we have furthermore found, that also aromatic phenols have a like action. Thus, a finely-subdivided indigo can for instance be obtained by blowing solutions of indigo leuco compounds with air, or by dissociating indigo salts by means of water in presence of phenol, cresol (particularly the technical cresol mixture), resorcin, guaiacol, pyrogallol, 1.4-dioxynaphthalene-mono-benzylether, β-oxyanthraquinone, α-anthrol, etc.

Example I: 100 parts by weight of an indoxyl melt of 20% strength are dissolved in 1000 parts of water with addition of 5 parts of resorcin, and this solution is then treated with air until the indigo precipitates. After having filtered and washed with water, an extremely finely-subdivided indigo-paste is obtained.

Example II: 100 parts by weight of indigo are introduced into 500 parts of sulfuric acid in which 20 parts of pyrogallol have been dissolved. The mass, forming a thick liquid, is then poured on ice-water while well stirring. The separated finely-divided indigo is filtered and washed with water.

Having now described our invention, what we claim is:

1. The process of manufacturing a new form of synthetic indigo, which consists in subjecting indol derivatives which are closely related to indigo and capable of directly yielding indigo to indigo-producing conditions in presence of a phenol.

2. The process of manufacturing a new form of synthetic indigo, which consists in subjecting indigo salts to indigo-producing conditions in presence of a phenol.

3. The process of manufacturing a new form of synthetic indigo, which consists in subjecting leuco-indigo salts to oxidation in presence of a phenol.

In testimony whereof, we affix our signatures in presence of two witnesses.

ALBRECHT SCHMIDT.
    ADOLF STEINDORFF.

Witnesses:
    JEAN GRUND,
    CARL GRUND.